United States Patent [19]

Darden

[11] Patent Number: 4,784,350

[45] Date of Patent: Nov. 15, 1988

[54] PASSIVE STEP TRIMMER FOR A MANEUVERING RE-ENTRY BODY (U)

[75] Inventor: Ralph M. Darden, Levittown, Pa.

[73] Assignee: The United States of America as represented by the Secretary of the Navy, Washington, D.C.

[21] Appl. No.: 22,125

[22] Filed: Feb. 12, 1979

[51] Int. Cl.[4] .............................................. F42B 15/02
[52] U.S. Cl. ................................. 244/3.1; 244/3.21; 244/160; 244/164
[58] Field of Search ............... 244/160, 164, 167, 3.1, 244/3.21

[56] References Cited

U.S. PATENT DOCUMENTS 3,160,366 12/1964 DeGraffenried .................. 244/160

4,186,900 2/1980 Loeb, Jr. ........................... 244/160

OTHER PUBLICATIONS

Lorell et al., "An Automatic Mass-Trim System for Spinning Spacecraft", AIAA Journal, vol. 10, No. 8, pp. 1012–1015.

Primary Examiner—Charles T. Jordan
Attorney, Agent, or Firm—C. D. B. Curry; K. S. Moss

[57] ABSTRACT

A passive step trimmer for a maneuvering re-entry body (MRB) which uses existing inertial forces acting on the MRB to deploy a free flowing mass from the rear of the MRB to trim the MRB altitude. The mass deployment from the MRB causes a forward shift in the center of gravity (CG) which in turn creates a more stable body which flies at a reduced angle-of-attack ($\alpha$).

8 Claims, 2 Drawing Sheets

PASSIVE STEP TRIMMER FOR A MANEUVERING RE-ENTRY BODY (U)

BACKGROUND OF THE INVENTION

1. Field of the Invention.

The present invention relates to altitude control of a vehicle, and more particularly to a passive step trimmer for a maneuvering re-entry body.

2. Description of the Prior Art.

Previous methods of changing the angle of attack of a vehicle during flight have required the use of active devices such as reaction jets. Such reaction jets require additional weight and exert additional forces to the vehicle.

Also, aerodynamic control surfaces such as canards, airfoils and the like have been used. Such surfaces also add weight and complexity to a re-entry vehicle.

SUMMARY OF THE INVENTION

Accordingly, the present invention provides a passive step trimmer for a maneuvering re-entry body (MRB) which uses the existing acceleration forces of the MRB for mass deployment. The mass deployment changes the center of gravity (CG) which in turn changes the angle-of-attack ($\alpha$). A high density free flowing material in a container located to the rear of the MRB is discharged overboard at a designated point inflight and at a given rate.

Therefore, it is an object of the present invention to provide a means for changing the center of gravity of an MRB by removing mass using existing accelerations as the deployment force.

Other objects, advantages and novel features of the present invention will be apparent from the following detailed description when read together with the appended claims and attached drawing.

DESCRIPTION OF THE PREFERRED EMBODIMENT

Figure 1:
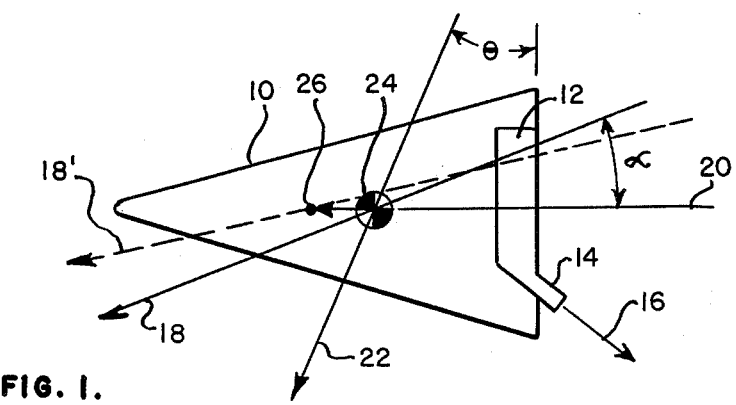
FIG. 1 is a diagrammatic view of the concepts of the present invention.

Referring to FIG. 1 a maneuverable re-entry body (MRB) 10 is shown. A deployable mass 12 is located at the base of the MRB 10. A port 14 is situated to allow the deployable mass 12 in the form of free flowing particles to flow from the MRB 10 along a path 16. The MRB 10 has a velocity vector 18 at an angle $\alpha$, the angle-of-attack, with the MRB geometric axis 20. A resultant force vector 22, representing the sum of the re-entry accelerations, acts through the MRB center of gravity (CG) 24. The angle $\theta$ represents the angle between the resultant force 22 and the base of the MRB 10.

When the deployable mass 12 is to be discharged, the port 14 is opened and the free flowing particles exit the MRB through the port along the deployment path 16. The particles flow solely as a result of the resultant force 22. As the deployable mass 12 is discharged, the CG 24 moves forward to point 26. The movement of CG 24 forward causes the velocity vector 18 to change as indicated by a new velocity vector 18' and reduce $\alpha$, thus producing a more stable MRB 10.

Figure 2:
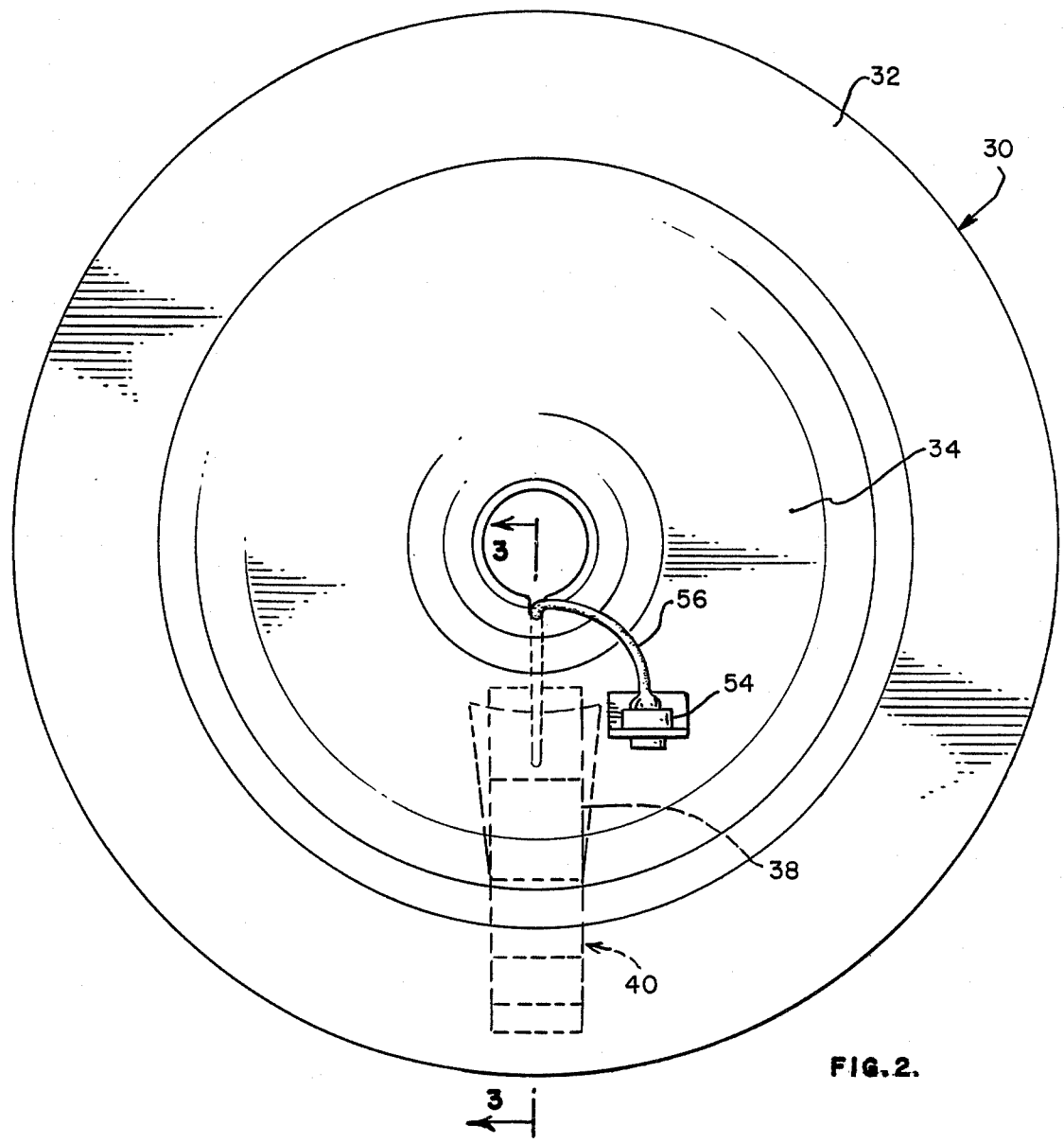
FIG. 2 is a plan view of the inner side of a bottom assembly for an MRB according to the present invention.
Figure 3:
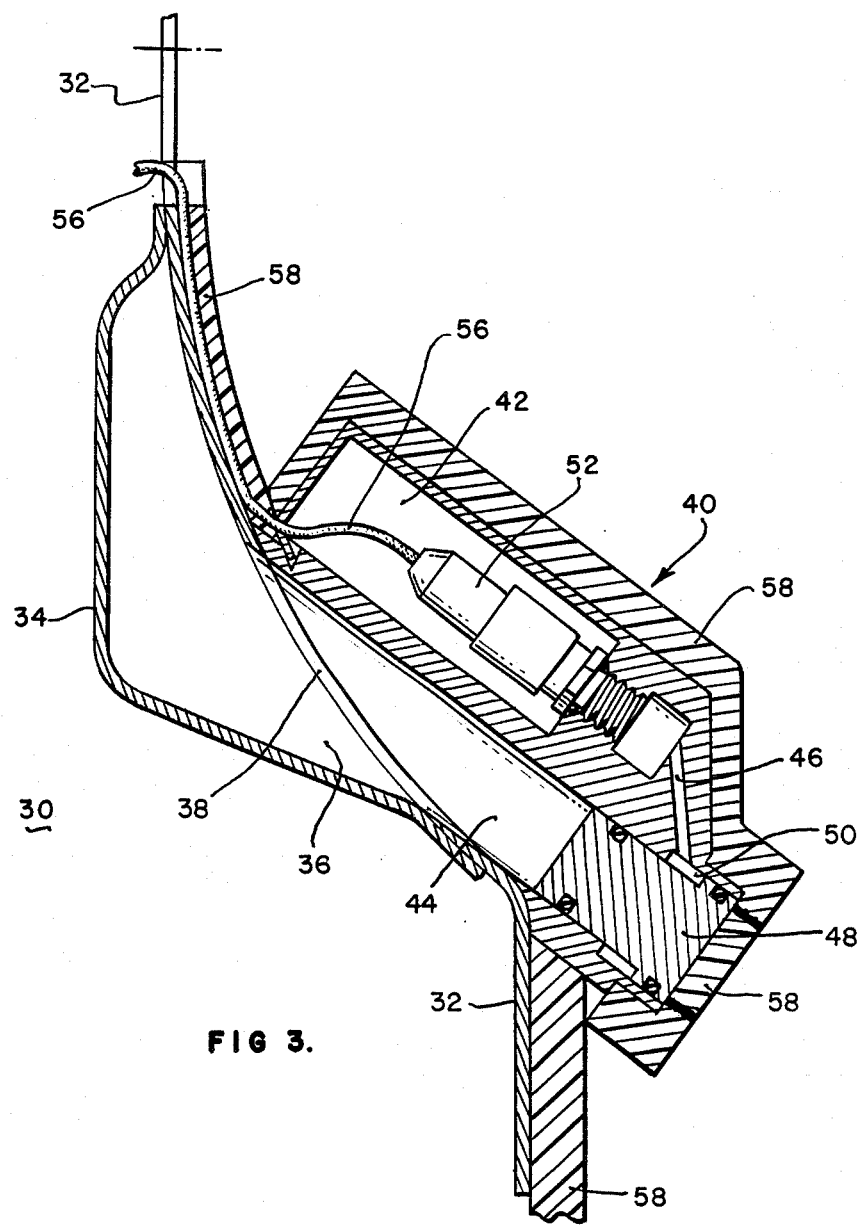
FIG. 3 is a cross-sectional view of the bottom assembly of FIG. 2 taken along line 3—3.

One specific embodiment of the present invention is illustrated in FIGS. 2 and 3. A bottom assembly 30 is shown which may be attached to cover the aft of an MRB 10 by any suitable means such as bolts, rivets or the like. A structural member 32, having suitable means for being attached to the MRB 10 such as bolt holes or the like (not shown), approximately circular in diameter and having an arcuate cross-section forms the basic aft cover. A container 34 of annular shape is attached to the interior surface (inwardly bowed) of the structural member 32 to form an annular cavity 36. A discharge port 38 through the structural member 32 provides an outlet from the cavity 36.

A pyroplug assembly 40 is attached to the exterior surface of the structure member 32 to cover the discharge port 38. The pyroplug assembly 40 has two cavities: an upper cavity 42 and a lower channel 44. The lower channel 44 is contiguous and in alignment with the discharge port 38. A pyro channel 46 connects the upper cavity 42 with the lower channel 44. A plug 48 is inserted into the external end of the lower channel 44 and is configured to have a pressure chamber 50 around it. A pyrotechnic device 52 such as a squib or other gas generator is installed in the upper cavity 42 such that upon ignition gases from the pyrotechnic device will flow through the pyro channel 46 into the pressure chamber 50 to jettison the plug 48, thus opening the lower channel 44. The electrical impulse to ignite the pyrotechnic device 52 is input via a connector 54 mounted on the surface of the annular container 34. An electrical cable 56 connects the connector 54 to the pyrotechnic device 52. The external surfaces of the structure member 32 and of the pyroplug assembly 40 have thermal protective material 58 bonded to them to limit the temperature at re-entry on the aft cover. The plug 48 also has a piece of the protective material 58 bonded to its external end.

In operation at a designated point in flight a command is generated in the form of an electrical impulse which is input to the pyrotechnic device 52 via the connector 54. The electrical impulse ignites the pyrotechnic device 52, and the gases generated flow through the pyro channel 46 to the pressure chamber 50 where they cause the plug 48 to be jettisoned. The high density free flowing material contained in the container cavity 36 is now free to flow from the cavity through the discharge port 38 and lower channel 44 under the resultant acceleration force 22 acting upon the MRB 10. The discharge of the free flowing material causes the center of gravity to move forward, thus decreasing the angle of attack of the MRB 10.

The free flowing material may be small diameter tungsten-carbide balls or the like. Also, a shutter actuated by an electrical or pneumatic solenoid may be used in lieu of the pyroplug assembly 40 to cover the discharge port 38.

Thus, the present invention provides a simple and reliable method for changing the angle of attack of an MRB in flight by using the existing acceleration forces for mass deployment. Since no additional forces are required, the system has an excellent mass fraction (useful weight/total weight).

What is claimed is:

1. A method for changing the angle of attack of a maneuvering re-entry body in flight comprising the step of discharging mass from said maneuvering re-entry body by using the existing trajectory accelerations as the discharging force.

2. A passive step trimmer for a maneuvering re-entry body comprising means for discharging mass from the rear of said maneuvering re-entry body at a designated point in flight by using the existing trajectory accelerations as the discharging force.

3. A passive step trimmer as recited in claim 2 wherein said discharging means comprises:
  (a) means attached to the rear of said maneuvering re-entry body for containing said mass to be discharged, said containing means having a discharge port; and
  (b) means for opening said discharge port at said designated point.

4. A passive step trimmer as recited in claim 3 wherein said mass to be discharged comprises a high density freely flowing material.

5. A passive step trimmer for a maneuvering re-entry body comprising:
  (a) a container situated within and to the rear of said maneuvering re-entry body;
  (b) a high density free flowing material within said container;
  (c) a discharge port from said container to a point external to said maneuvering re-entry body; and
  (d) an opening device to open said discharge port at a designated point in flight to allow the flow of said high density free flowing material from said container to said external point such that the center of gravity of said maneuvering re-entry body is shifted forward, changing the angle of attack of said maneuvering re-entry body.

6. A passive step trimmer as recited in claims 4 or 5 wherein said opening means comprises a pyroplug situated in said discharge port.

7. A passive step trimmer as recited in claims 4 or 5 wherein said opening means comprises a solenoid actuated shutter covering said discharge port.

8. A passive step trimmer as recited in claims 4 or 5 wherein said high density freely flowing material comprises small diameter tungsten-carbide balls.

* * * * *